H. HARRISON.
SHOCK ARRESTER.
APPLICATION FILED DEC. 4, 1915.

1,206,697.

Patented Nov. 28, 1916.
2 SHEETS—SHEET 1.

Inventor
Harris Harrison

Witnesses
A. E. Newkirk
J. S. ——

By Victor J. Evans
Attorney

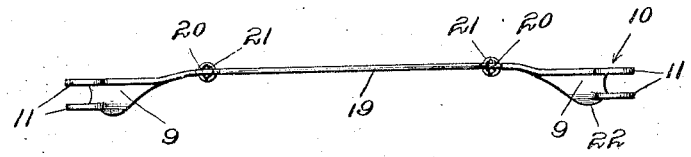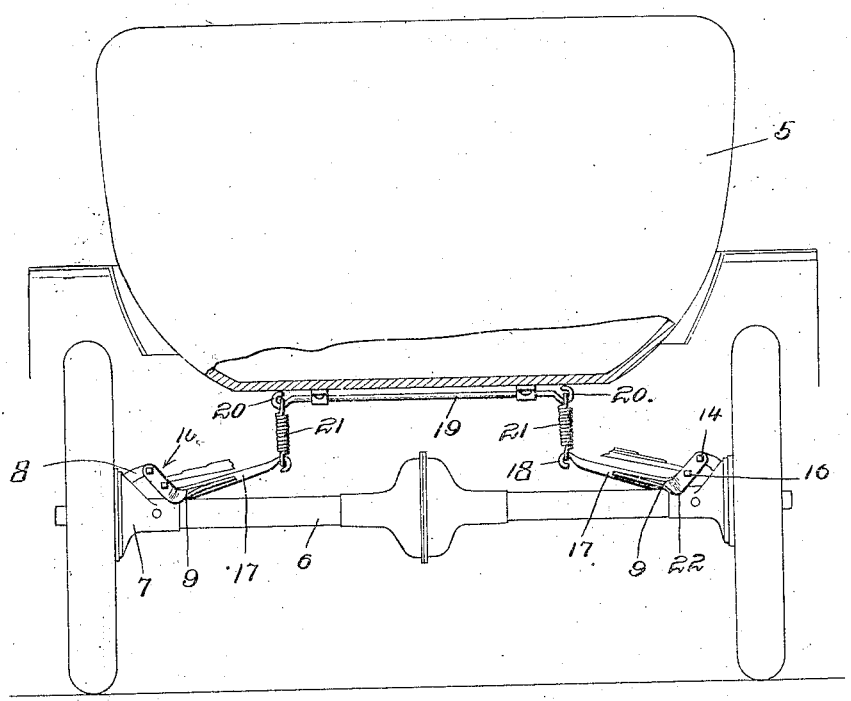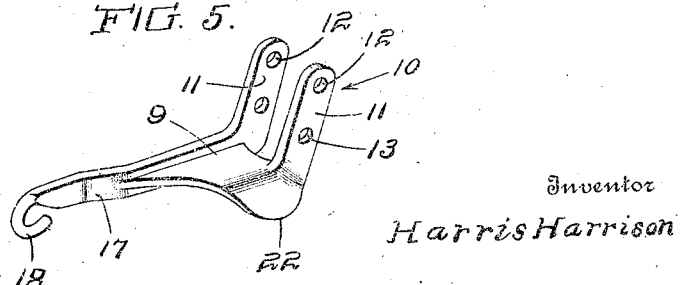

UNITED STATES PATENT OFFICE.

HARRIS HARRISON, OF STOUGHTON, WISCONSIN.

SHOCK-ARRESTER.

1,206,697.
Specification of Letters Patent.
Patented Nov. 28, 1916.

Application filed December 4, 1915. Serial No. 65,159.

*To all whom it may concern:*

Be it known that I, HARRIS HARRISON, a citizen of the United States, residing at Stoughton, in the county of Dane and State of Wisconsin, have invented new and useful Improvements in Shock-Arresters, of which the following is a specification.

This invention relates to improvements in shock arresters for motor vehicles.

The primary object of the invention is the provision of a device of the above stated character wherein the shock arrester is so mounted with relation to the motor vehicle that the same will serve as an absolute check against rebound or upthrow of the vehicle body.

A still further object of the invention is to provide a shock arrester to which the main leaf spring of the vehicle is connected, whereby when the wheel of the vehicle passes over an obstruction, the arms of the arrester will be forced down in close proximity to the rear axle of the vehicle and placing the strain on the helical springs connecting the free ends of the arms with the vehicle, and preventing rebounding of the main leaf spring until the helical springs react and by so doing prevent the rebounding of the vehicle body.

With the above and other objects in view, the invention consists in the novel features, details of construction and combination of parts which will hereinafter be more fully set forth, illustrated in the accompanying drawing, and pointed out in the appended claims.

Figure 1:
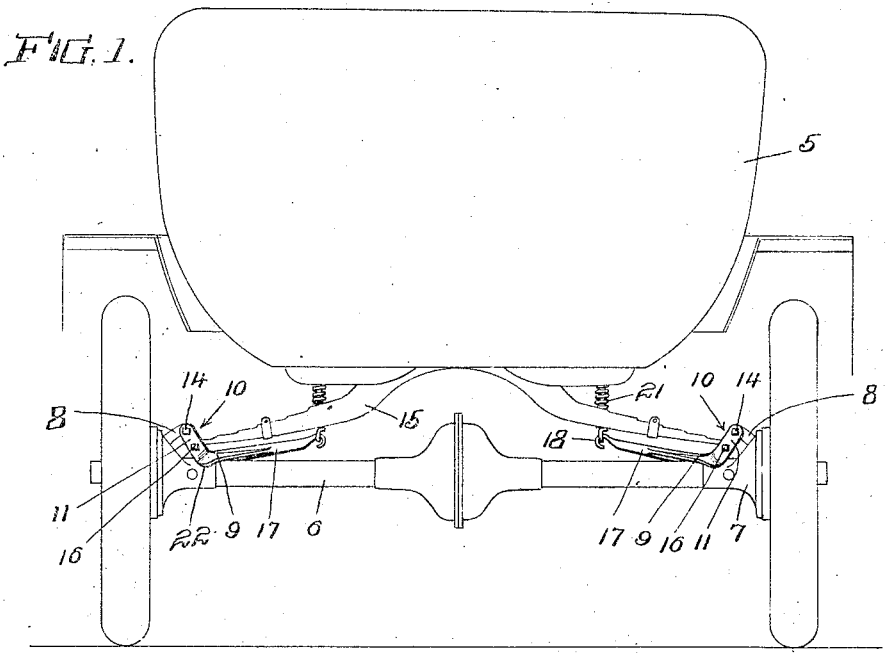
Figure 2:
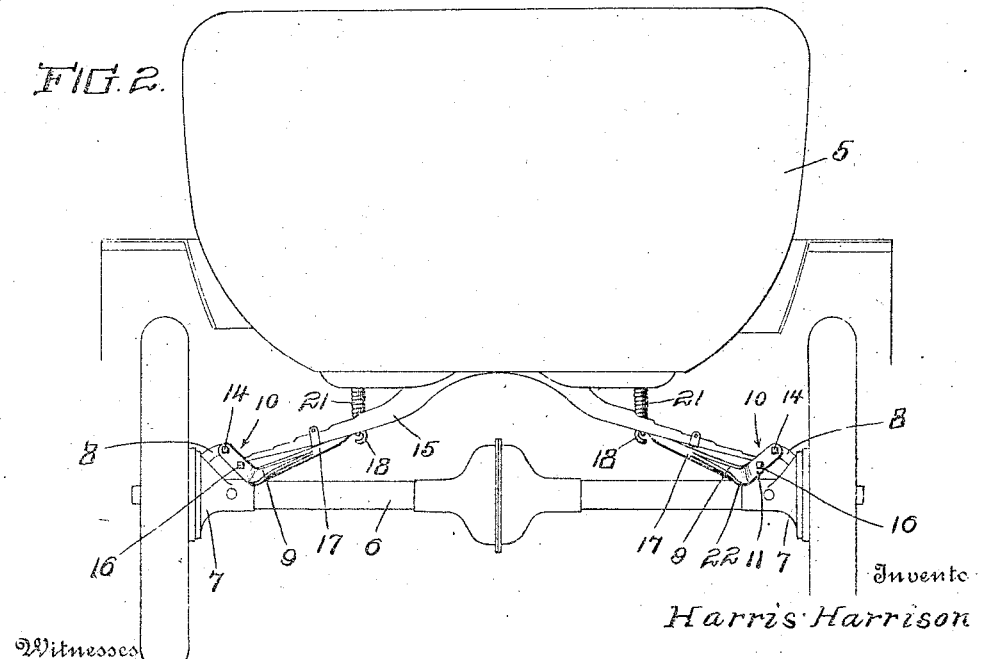

In the drawings: Figure 1 is a rear elevation of a portion of a motor vehicle showing my improved shock arrester attached thereto and illustrated in active use; Fig. 2 is a similar view to Fig. 1, illustrating the shock arrester in an inactive position; Fig. 3 is a plan view of the shock arresting device detached from the vehicle; Fig. 4 is a rear elevation of a portion of the vehicle partly shown in section, clearly illustrating the manner of connection of the helical springs thereto; and Fig. 5 is a perspective view of one of the bell crank levers.

In the accompanying drawing I have illustrated a conventional form of motor vehicle comprising a body portion 5, a rear axle 6, having casings 7 mounted thereon and the latter being provided with hangers 8, the latter being disposed in an inward and upwardly inclined direction.

In order to prevent the vehicle body against rebound or upthrow, I use in connection with a motor vehicle an improved form of shock arrester comprising a pair of bell crank levers 9 having formed on the inner end thereof and integral therewith a link 10 consisting of upstanding spaced parallel ears 11 provided with a series of alining apertures 12 and 13. A pivot in the form of a bolt 14 passes through the alining apertures 12 of the ears of the link and pivotally connects the bell crank lever to the hangers 8. The body spring 15 is pivotally connected at its opposite free ends with the link 12 of the bell crank levers by means of a pivot bolt 16, the latter passing through the alined apertures 13 of the link and is disposed at a point below and in superposed relation with the point of pivotal connection of the bell crank levers with the hangers 8, for a purpose which will hereinafter be clearly pointed out. The bell crank levers 9 further provide an arm 17 having an offset hooked end 18, and by the hooked end of the arm being offset, thereby preventing the engagement of the arm with the body spring 15 and permitting of a free vertical swinging movement of the arm at all times.

Connected to the vehicle body 5 and disposed transversely thereof is a connecting rod 19 having its opposite terminals formed with upturned hooked ends 20, the hooked ends 20 of the connecting rod 19 being disposed in substantially vertical alinement with the offset hooked ends 18 of the arm 17, and the latter is connected to the hooked ends 20 through the medium of a pair of strong helical springs 21, the purpose of the helical springs and their manner of connection with the bell crank levers will be clearly set forth as the description of the invention is proceeded with.

The link 10 and the arm 17 constituting the bell crank levers comprises an integral structure having a rounded connecting portion 22 which serves as a fulcrum for the bell crank levers 9 which will permit of a free rocking movement of the bell crank levers in opposite directions, when the vehicle body is subjected to a jar or rebound and further greatly improve the riding qualities of the vehicle when the latter is loaded. It will, of course, be understood that this rounded connecting portion 22 only contacts with the axle when the car is subjected to severe shocks or is overloaded by the weight of the passengers in the car. It will further be observed that the point of pivotal connection of the body spring 15 with the bell crank levers is at a point above the arm 17 thereof, thereby defining the arm in substantially parallel relation with the rear axle 7 of the vehicle and interposing the arm between the rear axle and the body spring.

In briefly describing the operation of my improved shock arrester, it is to be stated that when the body 5 of the vehicle is subjected to a jar or rebounding action caused by striking an obstruction in the road, the arms 17 of the bell crank levers 9 will be forced downwardly against the tension of the strong helical springs 21 disposing the same in close proximity with the rear axle 7 of the vehicle and moving the link portions 10 thereof in substantially a perpendicular position.

From the foregoing description taken in connection with the accompanying drawing, the advantages of construction and of the method of operation will be readily apparent to those skilled in the art to which the invention relates, and while I have described the principles of operation of the device together with the device which I now consider to be the best embodiment thereof, I desire to have it understood that the device shown is merely illustrative and that such advantages may be made when desired as are within the scope of the claims appended thereto.

I claim:

1. A shock absorber comprising a bell crank lever including a link and an arm, the point of connection of the link with the arm being rounded and serving as a fulcrum point for the bell crank lever, means for pivotally connecting the link of the bell crank lever with a vehicle axle casing, means on the pivoted end of the bell crank lever for supporting the body spring of the vehicle, and a tension spring adapted for connection with the body of the vehicle and also connected with the free end of the bell crank lever.

2. In combination with a motor vehicle including a rear axle having a casing thereon provided with hangers, a body spring for said vehicle, a shock absorber therefor embodying a pair of bell crank levers each formed with upstanding spaced ears having apertures and an arm provided with an offset hooked end, the angle of the bell crank levers serving as a fulcrum, means passing through said ears for pivotally connecting the levers with said hangers, means passing through the ears at a point below the former mentioned means for pivotally connecting between the ears the body spring, and yieldable means connected with the hooked ends of the said arms and with the body portion of the vehicle to permit of a vertical swinging movement of the levers.

3. In combination with a motor vehicle including a rear axle having a casing thereon provided with hangers, a body spring for said vehicle, a shock absorber therefor embodying a pair of bell crank levers each formed with upstanding spaced ears having apertures and an arm provided with an offset hooked end, the angle of the bell crank levers serving as a fulcrum, means passing through said ears for pivotally connecting the levers with said hangers, means passing through the ears at a point below the former mentioned means for pivotally connecting between the ears the body spring, defining the hooked ends of said arms in rear of said body spring, and yieldable means connected with the hooked ends of the said arms and with the body portion of the vehicle body substantially as and for the purpose specified.

4. In combination with a motor vehicle including a rear axle having a casing thereon provided with hangers, a body spring for said vehicle, a shock absorber therefor embodying a pair of bell crank levers each formed with upstanding spaced ears having apertures and an arm provided with an offset hooked end, means passing through said ears for pivotally connecting the levers with said hangers, means passing through the ears at a point below the former mentioned means for pivotally connecting between the ears the body spring, defining the hooked ends of said arms in rear of said body spring, a rod having hooked ends secured to the vehicle body and alining vertically with the hooked ends of said arms, and yieldable means connected with the hooked ends of said arms and the hooked ends of said rod.

5. A shock absorber comprising a pair of bell crank levers each embodying a link and an arm provided with an offset hooked end, the point of juncture of the link with the arm being rounded and serving as a fulcrum point for the bell crank levers, means for pivotally connecting the links of the bell crank levers with a vehicle axle casing, means on the pivoted end of the bell crank levers for supporting the body spring of the vehicle forwardly of the hooked ends of said arms and a tension spring adapted for connection with the body of the vehicle and also connected with the free end of each bell crank lever.

In testimony whereof I affix my signature in presence of two witnesses.

HARRIS HARRISON.

Witnesses:
ERLING K. LOVERUD,
AUG G. OLSEN.